United States Patent
Sakai

(10) Patent No.: US 10,730,183 B2
(45) Date of Patent: Aug. 4, 2020

(54) LEARNING DEVICE, CONTROLLER, AND CONTROL SYSTEM

(71) Applicant: FANUC CORPORATION, Yamanashi (JP)

(72) Inventor: Tamotsu Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 16/008,143

(22) Filed: Jun. 14, 2018

(65) Prior Publication Data

US 2018/0361576 A1    Dec. 20, 2018

(30) Foreign Application Priority Data

Jun. 15, 2017  (JP) .................................. 2017-117865

(51) Int. Cl.
| | | |
|---|---|---|
| *B25J 9/16* | (2006.01) | |
| *B25J 11/00* | (2006.01) | |
| *G05B 13/02* | (2006.01) | |

(52) U.S. Cl.
CPC ............. *B25J 9/163* (2013.01); *B25J 9/1694* (2013.01); *B25J 11/006* (2013.01); *B25J 11/0065* (2013.01); *G05B 13/027* (2013.01)

(58) Field of Classification Search
CPC ...... B25J 11/006; B25J 11/0065; B25J 9/163; B25J 9/1694; G05B 13/027
See application file for complete search history.

(56) References Cited

U.S. PATENT DOCUMENTS

| | | |
|---|---|---|
| 2001/0040439 A1 | 11/2001 | Kato et al. |
| 2011/0208356 A1 | 8/2011 | Kato et al. |
| 2013/0245824 A1 | 9/2013 | Barajas et al. |
| 2015/0127150 A1* | 5/2015 | Ponulak ................... B25J 9/163 |
| | | 700/250 |
| 2017/0028562 A1 | 2/2017 | Yamazaki et al. |
| 2017/0144301 A1 | 5/2017 | Washizu et al. |
| 2018/0003588 A1* | 1/2018 | Iwanami ................ G01M 13/04 |

(Continued)

FOREIGN PATENT DOCUMENTS

| | | |
|---|---|---|
| CN | 102189550 B | 6/2014 |
| DE | 102013203381 B4 | 7/2015 |

(Continued)

OTHER PUBLICATIONS

Machine translation of H7-319558 (Year: 1995).*

*Primary Examiner* — Ryan Rink
(74) *Attorney, Agent, or Firm* — Hauptman Ham, LLP

(57) ABSTRACT

A controller has a state observation unit to acquire a present state of a robot as a state variable, a label data acquisition unit to acquire, as a label, a detected value of a force sensor attached to an arm and to detect necessary data for control of a pressing force, and a learning unit to generate a learning model indicative of the correlation between the state variable acquired in a no-load state and the label acquired under the state variable acquired in the no-load state and to estimate the detected value of the force sensor. The controller controls the pressing force by using the detected value of the force sensor acquired in the present state of the robot acquired in a loaded state and the detected value of the force sensor estimated by the learning unit based on the present state of the robot acquired in the loaded state.

12 Claims, 3 Drawing Sheets

(56) References Cited

U.S. PATENT DOCUMENTS

| | | | |
|---|---|---|---|
| 2018/0225113 A1* | 8/2018 | Hasegawa | B25J 9/163 |
| 2019/0009407 A1* | 1/2019 | Iwanami | B65G 43/00 |
| 2019/0224844 A1 | 7/2019 | Tsuda et al. | |
| 2019/0291270 A1* | 9/2019 | Kiyama | B25J 9/163 |

FOREIGN PATENT DOCUMENTS

| | | |
|---|---|---|
| DE | 102016009030 A1 | 2/2017 |
| DE | 102016009113 A1 | 2/2017 |
| DE | 102016013731 A1 | 5/2017 |
| EP | 0933868 B1 | 6/2009 |
| JP | H4148307 A | 5/1992 |
| JP | H7-319558 A | 12/1995 |
| JP | 2011-189417 A | 9/2011 |

* cited by examiner

LEARNING DEVICE, CONTROLLER, AND CONTROL SYSTEM

RELATED APPLICATIONS

The present application claims priority of Japanese Patent Application No. 2017-117865, filed on Jun. 15, 2017, the disclosure of which is hereby incorporated by reference herein in its entirety.

BACKGROUND OF THE INVENTION

Field of the Invention

The present invention relates to a learning device, controller, and control system, and more particularly, to a learning device, controller, and control system capable of removing operating noise of a tool and finely controlling a pressing force.

Description of the Related Art

There are well-known robots that are configured to perform deburring, polishing and the like of a workpiece. One such robot comprises a tool for machining and a force sensor on the tip of its arm and controls the pressing force of the tool to be constant by using detected values of the force sensor. In some cases, however, the pressing force of the tool cannot be finely controlled due to the influence of operating noise of the tool. Specifically, if noise such as vibration is greater than the pressing force, the force sensor cannot detect the pressing force, so that it cannot determine whether or not the tool is in contact with the workpiece. Therefore, the conventional robot cannot press the tool with a very small force that used to be undetectable by the force sensor, so that it cannot avoid pressing the tool with a force greater than a desired one. If an attempt is made to absorb the operating noise with a spring or rubber, the pressing force will inevitably fail to be controlled as a result. For this reason, it is conventionally difficult to remove small burrs.

As regards this point, Japanese Patent Application Laid-Open No. 7-319558 describes how machine learning is performed with operation information of a machine used as input data and with disturbances (change of gravity components acting on a force sensor due to the posture of a device, force of inertia involved in the operation of the device, etc.) generated accompanying the operation of the machine in a no-load state used as teacher data, the disturbances are estimated from the operation information during the operation of the machine in a loaded state, and a net external force is estimated by subtracting estimated disturbance values from the actually obtained detected values of the force sensor.

However, elements that affect the operating noise of the machine are not always limited to the gravity component and the force of inertia, and vibration or operating noise peculiar to a rotary tool should be taken into account in such operations as deburring and polishing, in particular. Moreover, although there may be a plurality of postures the robot can assume in performing a certain operation, that is, there may be a plurality of combinations of angles of joint axes, there is a problem that the operating noise of the machine also changes depending on these postures.

SUMMARY OF THE INVENTION

The present invention has been made in consideration of these problems and its object is to provide a learning device, controller, and control system capable of removing operating noise of a tool and finely controlling a pressing force.

A controller according to one embodiment of the present invention is a controller which machines a workpiece by controlling a pressing force of a tool mounted on the tip of an arm of a robot and comprises a state observation unit configured to acquire a present state of the robot as a state variable, a label data acquisition unit configured to acquire, as a label, a detected value of a force sensor attached to the arm and configured to detect necessary data for control of the pressing force, and a learning unit configured to generate a learning model indicative of the correlation between the state variable acquired in a no-load state and the label acquired under the state variable acquired in the no-load state and to estimate the detected value of the force sensor corresponding to the present state of the robot, based on the learning model. The controller controls the pressing force by using the detected value of the force sensor acquired in the present state of the robot acquired in a loaded state and the detected value of the force sensor estimated by the learning unit based on the present state of the robot acquired in the loaded state.

In the controller according to the one embodiment of the present invention, the detected value of the force sensor is a force acting on the force sensor and/or a vibrational frequency acting on the force sensor.

In the controller according to the one embodiment of the present invention, the present state of the robot is at least one of factors including the operating direction, speed, acceleration, jerk, and posture of the robot and the rotational and vibrational frequencies of a drive unit of the tool.

In the controller according to the one embodiment of the present invention, the robot performs deburring and/or polishing of the workpiece.

A control system according to one embodiment of the present invention comprises a robot configured to machine a workpiece by means of a pressing force of a tool mounted on the tip of an arm and a controller configured to control the operation of the robot, the controller comprising a state observation unit configured to acquire a present state of the robot as a state variable, a label data acquisition unit configured to acquire, as a label, a detected value of a force sensor attached to the arm and configured to detect necessary data for control of the pressing force, and a learning unit configured to generate a learning model indicative of the correlation between the state variable acquired in a no-load state and the label acquired under the state variable acquired in the no-load state and to estimate the detected value of the force sensor corresponding to the present state of the robot, based on the learning model. The controller controls the pressing force by using the detected value of the force sensor acquired in the present state of the robot acquired in a loaded state and the detected value of the force sensor estimated by the learning unit based on the present state of the robot acquired in the loaded state.

A learning device according to one embodiment of the present invention comprises a state observation unit configured to acquire a present state of a robot as a state variable, a label data acquisition unit configured to acquire, as a label, a detected value of a force sensor attached to an arm of the robot and configured to detect necessary data for control of a pressing force of a tool mounted on the tip of the arm, and a learning unit configured to generate a learning model indicative of the correlation between the state variable acquired in a no-load state and the label acquired under the state variable acquired in the no-load state and to estimate the detected value of the force sensor corresponding to the present state of the robot, based on the learning model.

According to the present invention, there can be provided a learning device, controller, and control system capable of removing operating noise of a tool and finely controlling a pressing force.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
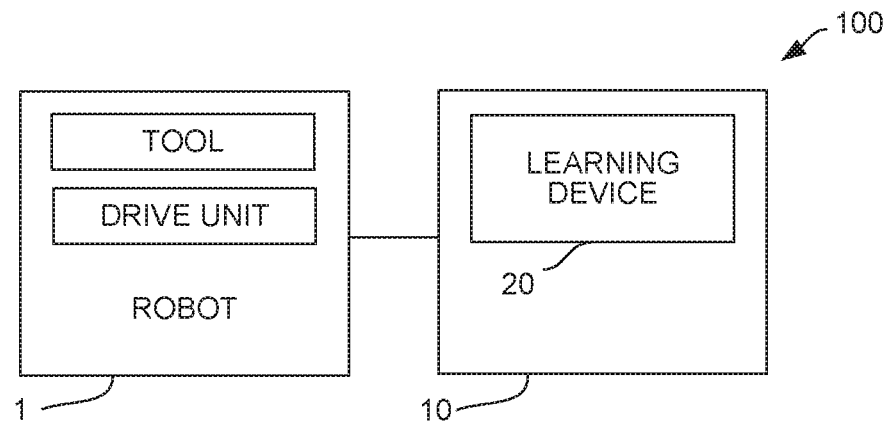
FIG. 1 is a schematic functional block diagram of a control system.

An embodiment of the present invention will now be described with reference to the accompanying drawings. Referring first to FIG. 1, there will be described a configuration of a control system 100 according to Embodiment 1 of the present invention. The control system 100 comprises a robot 1 and a controller 10 for controlling the robot 1. The controller 10 comprises a learning device 20.

Figure 2:
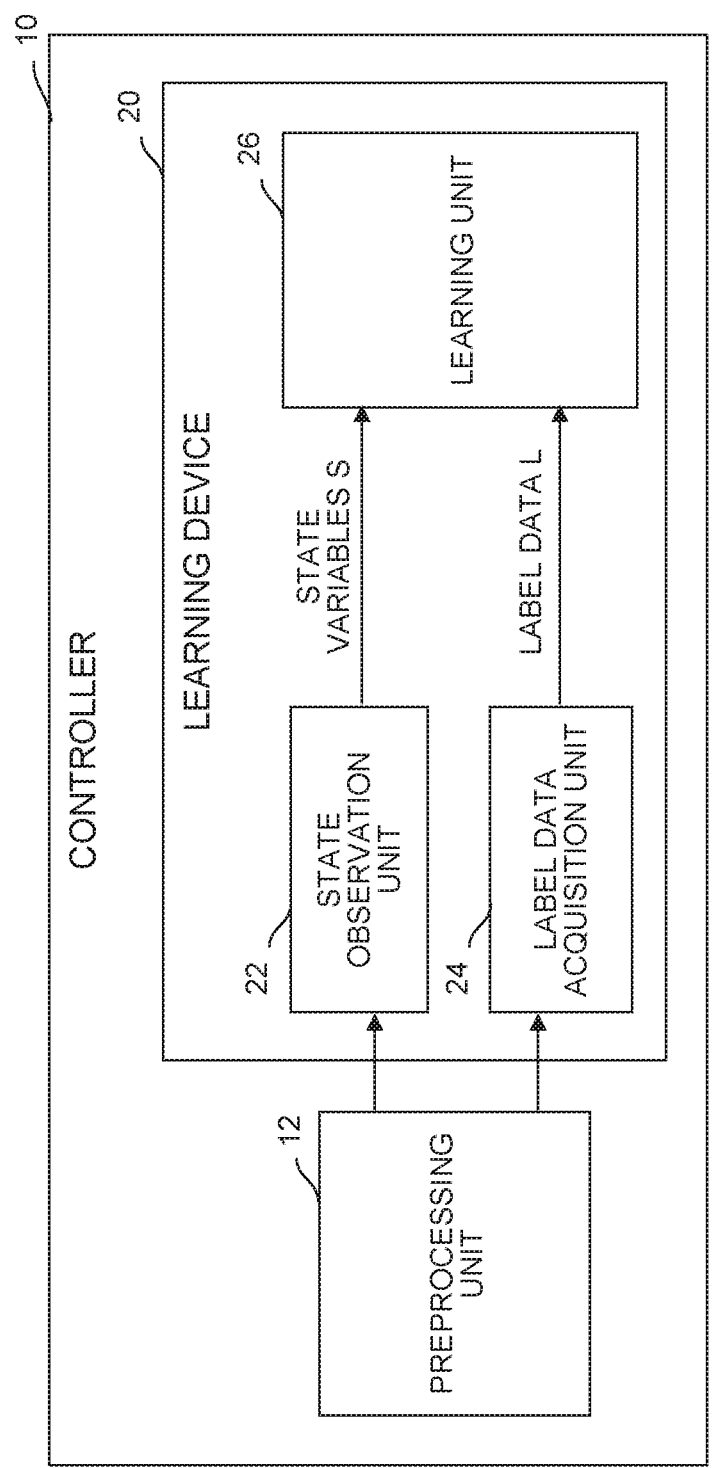
FIG. 2 is a schematic functional block diagram of a controller.

FIG. 2 is a functional block diagram showing a schematic configuration of the controller 10 according to Embodiment 1.

Typically, the controller 10 is a robot controller for controlling the operation of the robot 1. The controller 10 comprises a preprocessing unit 12, which acquires and preprocesses input data, and the learning device 20 including software (learning algorithm, etc.) and hardware (CPU of a computer, etc.) for self-learning based on the so-called machine learning.

The controller 10 interprets an operation program and controls the robot 1. A force sensor and a tool are mounted on the arm tip of the robot 1. The tool is, for example, a sander, eccentric-rotation buff, Leutor, or vibration file. A drive unit drives the tool at a vibrational or rotational frequency specified in the operation program or the like. The force sensor detects forces acting between the tool and a workpiece, especially forces or vibrational frequencies generated by the operation of the tool. The forces detected by the force sensor include a force such as a rotation or vibration generated by the tool operation itself, as well as a pressing force generated as the tool is pressed against the workpiece.

The learning device 20 creates, by machine learning, a model structure representative of the correlations of the state (operating direction, speed, acceleration, jerk, posture, etc.) of the robot 1 and the state (rotational frequency, vibrational frequency, etc.) of the drive unit of the tool attached to the robot 1 with the then detected values (force, vibrational frequency, etc.) of the force sensor. Specifically, the learning device 20 comprises a state observation unit 22 configured to observe state variables S representative of the present states of the robot 1 and the drive unit, a label data acquisition unit 24 configured to acquire label data L indicative of the detected values of the force sensor, and a learning unit 26 configured to learn the state variables S and the label data L in association with one another.

The preprocessing unit 12 can be constructed, for example, as a function of the CPU of the robot controller. Alternatively, the state observation unit 22 can be constructed, for example, as software for making the CPU of the robot controller function. The preprocessing unit 12 performs preprocessing for data obtained from the operation program of the robot 1, data indicative of the present states of the robot 1 and the drive unit obtained therefrom, data obtained from the force sensor attached to the robot 1, and the like, and outputs the preprocessed data to the state observation unit 22 and the label data acquisition unit 24. The preprocessing performed by the preprocessing unit 12 may, for example, be adjustment of the number of sampling data. The adjustment of the number of sampling data stated herein is processing that combines thinning of moving averages and data, reduction of the number of data by partial extraction, intermediate point interpolation, and data number increasing by fixed value addition. The preprocessing performed by the preprocessing unit 12 may be combined with processing for scaling such as conventional standardization.

In a learning stage, the controller 10 activates the robot 1 in a no-load state before workpiece machining or the like, and the preprocessing unit 12 acquires the sampling data at a predetermined sampling period. In a stage of utilizing the results of the learning, the controller 10 activates the robot 1 in a no-load state during the workpiece machining, and the preprocessing unit 12 acquires the sampling data at the predetermined sampling period. In either case, the preprocessing unit 12 serves to adjust the number of sampling data and deliver them to the state observation unit 22 and the label data acquisition unit 24, thereby maintaining and improving the accuracy of the machine learning by the learning device 20 relative to the diversity of operation setting.

The state observation unit 22 can be constructed, for example, as a function of the CPU of the robot controller. Alternatively, the state observation unit 22 can be constructed, for example, as software for making the CPU of the robot controller function. The preprocessing unit 12 may be configured to output instantaneous values, such as the operating direction, speed, acceleration, jerk, and posture of the robot 1 and the rotational and vibrational frequencies of the drive unit of the tool attached to the robot 1, directly as the state variables S to the state observation unit 22. The operating direction, speed, acceleration, jerk, and posture of the robot 1 and the rotational and vibrational frequencies of the drive unit of the tool attached to the robot 1, and the like can be acquired, for example, as data obtained from the operation program of the robot 1, data obtained directly from the robot 1 and the drive unit, and data obtained by using or converting these data. In general, the operating direction, speed, acceleration, and jerk are those of the tip of the robot 1. Moreover, the data indicative of the posture of the robot 1 can, for example, be acquired as a combination of angles of joint axes of the arm.

The label data acquisition unit 24 can be constructed, for example, as a function of the CPU of the robot controller. Alternatively, the label data acquisition unit 24 can be constructed, for example, as software for making the CPU of the robot controller function. The label data L acquired by the label data acquisition unit 24 are, for example, forces and frequencies acquired from the force sensor attached to the tip of the robot 1 or data obtained after these data are preprocessed by the preprocessing unit 12. Thus, in short, the label data L are data that indicate the forces and vibrational frequencies detected by the force sensor under the state variables S.

In the learning stage of the learning device 20, execution of the operation of the robot 1 in the no-load state, detection of the states of the robot 1 and the drive unit during the execution, and detection of the forces and vibrational frequencies by the force sensor are carried out.

The learning unit 26 can be constructed, for example, as a function of the CPU of the robot controller. Alternatively, the learning unit 26 can be constructed, for example, as software for making the CPU of the robot controller function. The learning unit 26 learns the relationships between the state variables S representative of the present states of the robot 1 and the drive unit and the label data L indicative of the detected values of the force sensor according to an arbitrary learning algorithm collectively called the machine learning. The learning unit 26 can repeatedly perform learning based on a data set including the above state variables S and the label data L while the robot 1 is performing a plurality of operations. When this is done, the robot 1 should preferably be operated in a plurality of operation patterns so as to cover various combinations of postures, rotational frequencies, vibrational frequencies and the like.

By repeating these learning cycles, the learning unit 26 can automatically identify characteristics suggestive of the correlations between the state variables S representative of the present states of the robot 1 and the drive unit and the label data L indicative of the detected values of the force sensor. Although the correlations between the state variables S and the label data L are unknown at the start of the learning algorithm, the learning unit 26 interprets the correlations by gradually identifying the characteristics with the progress of the learning. If the correlations between the state variables S and the label data L are interpreted to some reliable level, the learning results repeatedly output by the learning unit 26 can be used to estimate the detected values of the force sensor based on the present states of the robot 1 and the drive unit.

The state variables S are composed of data that are not easily influenced by disturbances, while the label data L are obtained uniquely. Thus, according to the learning device 20 of the controller 10, the estimation of the detected values of the force sensor corresponding to the present states of the robot 1 and the drive unit can be performed automatically and accurately by using the learning results of the learning unit 26.

If the estimation of the detected values of the force sensor in the no-load state can be performed automatically and accurately, only the forces and vibrational frequencies generated by the machining can be calculated by subtracting estimated detected values of the force sensor in the no-load state from detected values of the force sensor actually measured in a loaded state. Thus, during workpiece machining such as deburring or polishing, the preprocessing unit 12 and the state observation unit 22, as in the learning stage, acquires the state (operating direction, speed, acceleration, jerk, posture, etc.) of the robot 1 and the state (rotational frequency, vibrational frequency, etc.) of the drive unit of the tool attached to the robot 1 as the state variables S. The learning unit 26 inputs the state variables S to a learned model and outputs the estimated values of the force sensor under the state variables S. On the other hand, the controller 10 acquires the present detected values (force, vibrational frequency, etc.) of the force sensor. Moreover, the controller 10 subtracts the estimated values output by the learning unit 26 from the present detected values of the force sensor. The data obtained in this manner are data that indicate only the forces and vibrational frequencies generated due to the workpiece machining such as deburring or polishing.

For example, the controller 10 can perform the above processing as cycle control. Specifically, the learning unit 26 calculates estimated values of the outputs of the force sensor at a fixed period. When the present detected values of the force sensor are acquired, the controller 10 calculates the forces and vibrational frequencies generated due to the machining by using the estimated value of the output of the force sensor calculated at the previous period. According to this method, an estimated value that is used to cancel noise is a previous one. Since the noise can be supposed to change substantially linearly, depending on the state changes of the robot 1 and the drive unit, however, practically serious errors cannot be generated.

Alternatively, the controller 10 can achieve control free from the above periodic errors in performing such machining as to repeat the same operations many times. In this case, the operation patterns of the robot 1 and the drive unit are fixed, so that the learning unit 26 performs learning specific to the operation patterns of the robot 1 and the drive unit used in the machining, in the learning stage. Moreover, in the stage of utilizing the learning results, the controller 10 performs noise canceling processing using the learning results, starting from the first stage of the machining.

Thus, according to the present embodiment, the learning device 20 constructs a learning model indicative of correlations between the present states of the robot 1 and the drive unit in the no-load state and the detected values of the force sensor. Moreover, the learning device 20 estimates the detected values of the force sensor in the no-load state corresponding to the present states of the robot 1 and the drive unit, based on the learned model. Furthermore, the controller 10 subtracts the estimated detected values of the force sensor in the no-load state from the detected values of the force sensor during the machining, thereby detecting only the forces generated by the machining. In this way, operating noise of the tool can be removed to enable detection of small forces generated due to the workpiece machining such as deburring or polishing, so that fine machining can be achieved. In particular, the operating noise of the tool varies greatly depending on the vibrational or rotational frequency of the drive unit, the posture of the arm of the robot 1, and the like, as well as on the operation (direction, speed, acceleration, jerk, etc.) of the robot 1. According to the present embodiment, the operating noise attributable to these factors can be removed, so that the device of the present embodiment is useful for the machining such as deburring or polishing, in particular.

In a modification of the learning device 20 of the controller 10, the learning unit 26 can learn the detected values of the force sensor corresponding to the respective operation states of a plurality of robots 1 having the same configuration, using state variables S and label data L obtained individually for the robots 1. According to this configuration, the volume of a data set including the state variables S and the label data L obtained in a certain period of time can be increased, so that the speed and reliability of the learning in an abnormal state of an injection molding machine relative to the operation state of the machine, with more diverse data sets used as inputs.

Figure 3:
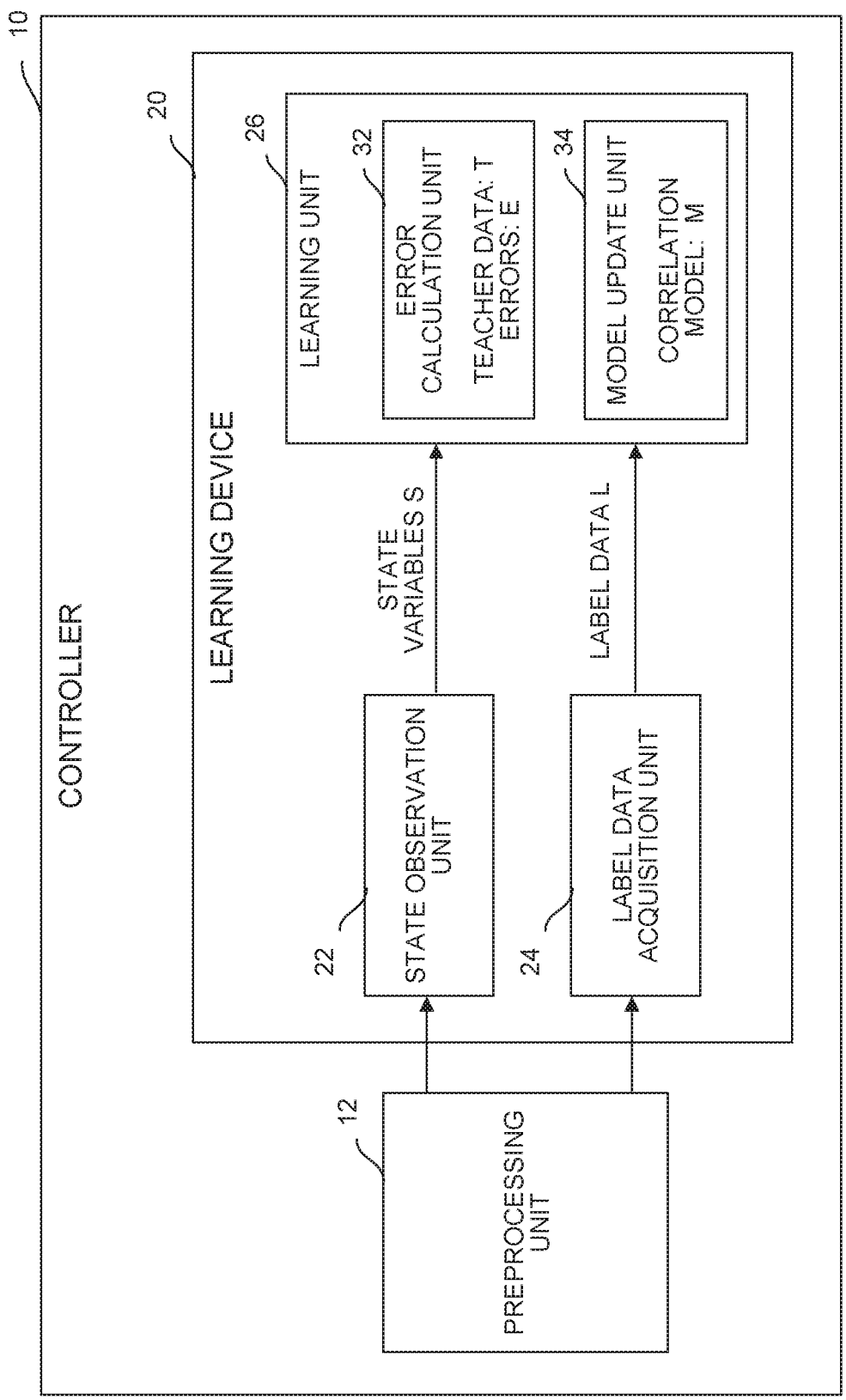
FIG. 3 is a schematic functional block diagram showing one form of the controller.

In the learning device 20 having the above configuration, the learning algorithm executed by the learning unit 26 is not particularly limited and a conventional learning algorithm can be used as the machine learning. FIG. 3 shows a configuration based on a form of the controller 10 shown in FIG. 2, in which the learning unit 26 performs supervised learning as an example of the learning algorithm. The supervised learning is a method in which a large volume of known data sets (called teacher data) including inputs and outputs corresponding thereto are given in advance, and characteristics suggestive of the correlations between the inputs and the outputs are identified from these teacher data, whereby a correlation model (detected values of the force sensor corresponding to the present states of the robot 1 and the drive unit in the learning device 20 of the present invention) for estimating an output required for a new input is learned.

In the learning device 20 of the controller 10 shown in FIG. 3, the learning unit 26 comprises an error calculation unit 32 and a model update unit 34. The error calculation unit 32 calculates errors E between a correlation model M that derives the detected values of the force sensor from the state variables S and correlation characteristics identified from teacher data T prepared in advance. The model update unit 34 updates the correlation model M so as to reduce the errors E. The learning unit 26 learns the detected values of the force sensor corresponding to the present states of the robot 1 and the drive unit as the model update unit 34 repeats the update of the correlation model M.

The correlation model M can be constructed by regression analysis, reinforcement learning, deep learning or the like. An initial value of the correlation model M is given, for example, as a simplified representation of the correlations between the state variables S and the detected values of the force sensor, to the learning unit 26 before the start of the supervised learning. For example, the teacher data T can be composed of experience values (known data sets including the present states of the robot 1 and the drive unit and the detected values of the force sensor) stored as the detected values of the force sensor corresponding to the past present states of the robot 1 and the drive unit are recorded, and are given to the learning unit 26 before the start of the supervised learning. The error calculation unit 32 identifies the correlation characteristics suggestive of the correlations of the detected values of the force sensor with the present states of the robot 1 and the drive unit from the large volume of teacher data T given to the learning unit 26, and obtains the errors E between the correlation characteristics and the correlation model M corresponding to the state variables S in the present states. The model update unit 34 updates the correlation model M so as to reduce the errors E according to a predetermined update rule, for example.

In the next learning cycle, the error calculation unit 32 obtains the errors E with respect to the correlation model M corresponding to the state variables S and the label data L, using the state variables S and the label data L obtained by performing the operation of the robot 1 according to the updated correlation model M, and the model update unit 34 updates the correlation model M again. In this way, the correlation between the present states of the environments (present states of the robot 1 and the drive unit) having so far been unknown and determination of the corresponding states (determination of the detected values of the force sensor) gradually becomes clear. In other words, the relationships between the present states of the robot 1 and the drive unit and detected values of the force sensor are gradually approximated to an optimal solution by updating the correlation model M.

Figure 4A:
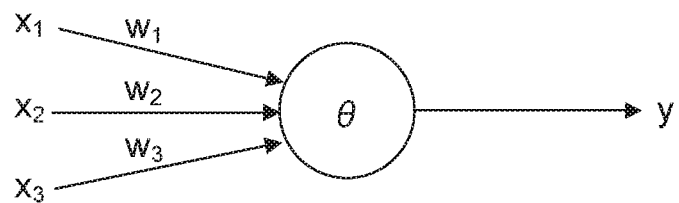
FIG. 4A is a diagram illustrating a neuron.
Figure 4B:
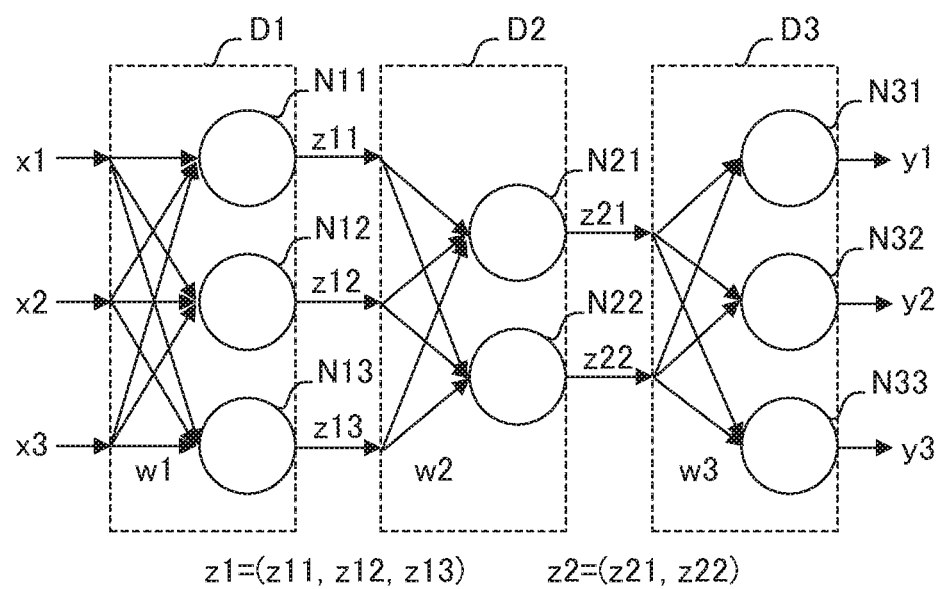
FIG. 4B is a diagram illustrating a neural network.

For example, a neural network can be used to advance the above supervised learning. FIG. 4A schematically shows a model of a neuron. FIG. 4B schematically shows a model of a three-layer neural network constructed by combining the neurons shown in FIG. 4A. The neural network can be composed of, for example, an arithmetic unit or a storage device imitating the neuron model.

The neuron shown in FIG. 4A outputs results y from a plurality of inputs x (e.g., inputs $x_1$ to $x_3$). The inputs $x_1$ to $x_3$ are multiplied by their corresponding weights w ($w_1$ to $w_3$). Thus, the neuron delivers the outputs y represented by Equation 2 below. In Equation 2, the inputs x, outputs y, and weights w are all vectors. Moreover, $\theta$ is a bias and $f_k$ is an activation function.

$$y = f_k(\Sigma^n_{i=1} x_i w_i - \theta).$$

In the three-layer neural network shown in FIG. 4B, inputs x (e.g., inputs x1 to x3) are input from the left side and results y (e.g., results y1 to y3) are output from the right side. In the illustrated example, the individual inputs x1, x2 and x3 are multiplied by their corresponding weights (collectively represented by w1) and each of them is input to three neurons N11, N12 and N13.

In FIG. 4B, the respective outputs of the neurons N11 to N13 are collectively represented by z1. The outputs z1 can be regarded as feature vectors based on the extraction of the feature quantity of input vectors. In the illustrated example, the individual feature vectors z1 are multiplied by their corresponding weights (collectively represented by w2) and each of them is input to two neurons N21 and N22. The feature vectors z1 represent features between the weights w1 and w2.

In FIG. 4B, the respective outputs of the neurons N21 and N22 are collectively represented by z2. The outputs z2 can be regarded as feature vectors based on the extraction of the feature quantity of the feature vectors z1. In the illustrated example, the individual feature vectors z2 are multiplied by their corresponding weights (collectively represented by w3) and each of them is input to three neurons N31, N32 and N33. The feature vectors z2 represent features between the weights w2 and w3. Finally, the neurons N31 to N33 output the results y1 to y3, respectively.

In the learning device 20 of the controller 10, the detected values (results y) of the force sensor can be output as the learning unit 26 performs a calculation of a multi-layer structure based on the above neural network with the state variables S used as the inputs x. Operation modes of the neural network include a learning mode and a determination mode. For example, the weights w can be learned using a learning data set in the learning mode, while the detected values of the force sensor can be determined in the determination mode using the learned weights w. Detection, classification, inference and the like can also be performed in the determination mode.

The above configuration of the controller 10 can be described as a machine learning method (or software) performed by the CPU of the computer. This machine learning method is a learning method for learning the detected values of the force sensor corresponding to the present states of the robot 1 and the drive unit. This method comprises a step in which the CPU of the computer observes the state variables S indicative of the present states of the robot 1 and the drive unit, a step of acquiring the label data L indicative of the detected values of the force sensor, and a step of learning the present states of the robot 1 and the drive unit and the detected values of the force sensor in association with one another, using the state variables S and the label data L.

While an embodiment of the present invention has been described herein, the invention is not limited to the above-described embodiment and may be suitably modified and embodied in various forms.

For example, the learning algorithm executed by the learning device 20, a control algorithm executed by the controller 10, and the like are not limited to those described above and various algorithms can be used.

Moreover, although the preprocessing unit 12 is provided on the controller 10 in the above-described embodiment, it may alternatively be provided on the robot 1. In this case, the preprocessing may be performed in either or both of the controller 10 and the robot 1, and the location of the processing may be enabled to be suitably set in consideration of the processing capacity and the speed of communication.

Furthermore, in the above-described embodiment, the state variables S and the label data L are given by way of example only. Only some of the above data can be used as the state variables S, or otherwise, other data indicative of the present states of the robot 1 and the drive unit can be used for this purpose. Moreover, only some of the above data, or otherwise, other data that can be output by the force sensor can be used as the label data.

The invention claimed is:

1. A controller which machines a workpiece by controlling a pressing force of a tool mounted on the tip of an arm of a robot, the controller comprising:
a processor configured to:
acquire a present state of the robot as a state variable;
acquire, as a label, a detected value of a force sensor attached to the arm and configured to detect necessary data for control of the pressing force; and
generate a learning model indicative of the correlation between the state variable acquired in a no-load state and the label acquired under the state variable acquired in the no-load state and to estimate the detected value of the force sensor corresponding to the present state of the robot, based on the learning model,
wherein
the processor is further configured to control the pressing force by using the detected value of the force sensor acquired in the present state of the robot acquired in a loaded state and the estimated detected value of the force sensor based on the present state of the robot acquired in the loaded state,
the tool is configured to machine the workpiece by vibration, and
the present state of the robot includes at least a vibrational frequency of the tool.

2. The controller according to claim 1, wherein the detected value of the force sensor is a force acting on the force sensor and/or a vibrational frequency acting on the force sensor.

3. The controller according to claim 1, wherein the present state of the robot is at least one of factors including the operating direction, speed, acceleration, jerk, and posture of the robot and the rotational and vibrational frequencies of a drive unit of the tool.

4. The controller according to claim 1, wherein the robot performs deburring and/or polishing of the workpiece.

5. A control system which comprises a robot configured to machine a workpiece by means of a pressing force of a tool mounted on the tip of an arm and a controller configured to control the operation of the robot,
the controller comprising a processor configured to:
acquire a present state of the robot as a state variable;
acquire, as a label, a detected value of a force sensor attached to the arm and detect necessary data for control of the pressing force; and
generate a learning model indicative of the correlation between the state variable acquired in a no-load state and the label acquired under the state variable acquired in the no-load state and to estimate the detected value of the force sensor corresponding to the present state of the robot, based on the learning model,
wherein
the processor is further configured to control the pressing force by using the detected value of the force sensor acquired in the present state of the robot acquired in a loaded state and the estimated detected value of the force sensor based on the present state of the robot acquired in the loaded state,
the tool is configured to machine the workpiece by vibration, and
the present state of the robot includes at least a vibrational frequency of the tool.

6. A learning device comprising:
a processor configured to:
acquire a present state of a robot as a state variable;
acquire, as a label, a detected value of a force sensor attached to an arm of the robot and detect necessary data for control of a pressing force of a tool mounted on the tip of the arm; and
generate a learning model indicative of the correlation between the state variable acquired in a no-load state and the label acquired under the state variable acquired in the no-load state and to estimate the detected value of the force sensor corresponding to the present state of the robot, based on the learning model, wherein
the tool is configured to machine the workpiece by vibration, and
the present state of the robot includes at least a vibrational frequency of the tool.

7. The controller according to claim 1, further comprising a preprocessor configured to
preprocess for at least one of (1) data obtained from an operation program of the robot, (2) data indicative of the present states of the robot or a drive unit of the robot, or (3) data obtained from the force sensor, and output the preprocessed data to the processor.

8. The controller according to claim 7, wherein the preprocessor is further configured to adjust the number of sampling data by combining at least two of (1) thinning of moving averages and data, (2) reduction of the number of data by partial extraction, (3) intermediate point interpolation, or (4) increasing of data number by fixed value addition.

9. The control system according to claim 5, wherein the controller further comprises
a preprocessor configured to
preprocess for at least one of (1) data obtained from an operation program of the robot, (2) data indicative of the present states of the robot or a drive unit of the robot, or (3) data obtained from the force sensor, and output the preprocessed data to the processor.

10. The control system according to claim 9, wherein the preprocessor is further configured to adjust the number of sampling data by combining at least two of (1) thinning of moving averages and data, (2) reduction of the number of data by partial extraction, (3) intermediate point interpolation, or (4) increasing of data number by fixed value addition.

11. The learning device according to claim 6, further comprising a preprocessor configured to
preprocess for at least one of (1) data obtained from an operation program of the robot, (2) data indicative of the present states of the robot or a drive unit of the robot, or (3) data obtained from the force sensor, and
output the preprocessed data to the processor.

12. The learning device according to claim 11, wherein the preprocessor is further configured to adjust the number of sampling data by combining at least two of (1) thinning of moving averages and data, (2) reduction of the number of data by partial extraction, (3) intermediate point interpolation, or (4) increasing of data number by fixed value addition.

\* \* \* \* \*